United States Patent [19]
Takano et al.

[11] 3,815,453
[45] June 11, 1974

[54] AUTOMATIC LATHE

[75] Inventors: Hirotugu Takano; Toshitsugu Inoue, both of Kyoto, Japan

[73] Assignee: Matsushita Electric Industrial Co., Ltd., Osaka, Japan

[22] Filed: Mar. 23, 1972

[21] Appl. No.: 237,582

Related U.S. Application Data

[62] Division of Ser. No. 38,695, May 19, 1970, Pat. No. 3,680,415.

[30] Foreign Application Priority Data
May 26, 1969  Japan.................................. 46-42356

[52] U.S. Cl. ................................................ 82/2.5
[51] Int. Cl. ........................................... B23b 13/00
[58] Field of Search............. 82/2, 2.5, 2.7, 2 A, 2 B

[56] References Cited
UNITED STATES PATENTS

| | | | |
|---|---|---|---|
| 2,664,557 | 12/1953 | Sargrove | 82/2.5 R X |
| 3,200,680 | 8/1965 | Coffin | 82/2.5 |
| 3,324,364 | 6/1967 | Caruthers | 82/2 B |
| 3,354,760 | 11/1967 | Barragan | 82/2 |
| 3,555,658 | 1/1971 | Mobius et al. | 82/2.5 |
| 3,641,849 | 2/1972 | Kinney | 82/2 B |
| 3,691,879 | 8/1972 | Blade | 82/2.5 R |
| 3,710,466 | 1/1973 | Williamson et al. | 82/2.5 R X |
| 2,897,638 | 8/1959 | Maker | 82/2.5 R X |

*Primary Examiner*—Harrison L. Hinson
*Attorney, Agent, or Firm*—Stevens, Davis, Miller & Mosher

[57] ABSTRACT

An automatic lathe wherein a plurality of cutters are provided in confronting relation to a rotating rod material, and the movement of the said rod material and the said cutters are controlled according to a working information stored in a tape or card, whereby a complete parts is obtained automatically according to the said working information.

4 Claims, 25 Drawing Figures

AUTOMATIC LATHE

This is a division, of application Ser. No. 38,695, filed 5/19/1970 now Pat. No. 3,680,415.

This invention relates to an automatic lathe.

The most typical one of the conventional automatic lathes is a Swiss-type automatic lathe, which will be described hereunder with reference to FIGS. 1 to 6. In turning a rod material, first of all, the rod material 1 is rotated and a cutter 2 is fed in the radial direction of the rod material 1 or in the direction of the arrow *a*, to turn the peripheral wall of the rod material as shown in FIG. 1. The depth of turning is variable depending upon the degree of feeding of the cutter 2. Then, a cutter 3 is fed in the axial direction of the rod material 1 or in the direction of the arrow *b* and pressed against the end face of the rod material, whereby the end face of the rod material 1 is cut. In this case, a hole may be formed in the end face of the rod material 1 by using a drill as the cutter 3. In the turning operation, the rod material is moved in the direction of the arrow *c*. An automatic lathe is constructed according to such basic arrangement of the rod material 1 and the cutters 2, 3.

In the actual Swiss-type automatic lathe, as shown in FIG. 2, a first cutting tool 4, a second cutting tool 5, a third cutting tool 6, a fourth cutting tool 7 and a fifth cutting tool 8 are arranged radially of a rod material 9 to be cut. The first cutting tool 4 and the second cutting tool 5 are mounted on a rockable cutter mount 11 which is rockable about a fulcrum 10. Thus, it will be seen that, in the rocking motion of the rockable cutter mount 11, the second cutting tool 5 moves away from the rod material 9 as the first cutting tool 4 approaches the rod material, whereas the first cutting tool 4 moves away from the rod material as the second cutting tool 5 approaches the rod material. When the rockable cutter mount 11 is in a horizontal position, both the first cutting tool 4 and the second cutting tool 5 are held out of contact with the rod material 9. The rocking motion of the rockable cutter mount 11 is caused by a cam 13 which is mounted on a cam shaft 12 to be rotated thereby and held in engagement with a cam follower 14, fixed to the cutter mount 11, to cause it to move up and down, the cam shaft 12 being driven at a constant speed. The cam follower 14 is held in pressure contact with the cam 13 under the biasing force of a spring 15. Thus, the rockable cutter mount 11 rocks precisely in accordance with the profile of the cam 13. On the other hand, the third cutting tool 6, the fourth cutting tool 7 and the fifth cutting tool 8, which are called vertical cutting tools, have the same construction, so that a description will be given only on the third cutting tool 6 hereunder. A control cam 16 for the third cutting tool 6 is fixedly mounted on the cam shaft 12 and a cam follower 19 provided on an arm 18 is yieldably pressed against the control cam 16 by a spring or the like (not shown). The arm 18 is pivotable about a pivot pin 17 and has one end pivotally connected to one end of a link 20. The link 20 has the other end pivotally connected to one end of an arm 22 which is pivotable about a pivot pin 21. The other end of the arm 22 is provided with a set screw 23 which is in abutting engagement at one end with the end face of a cutter mount 24 which holds the third cutting tool 6. It will, therefore, be understood that when the control cam 16 is rotated, the cam follower 19 makes a vertical movement, following the profile of the control cam and the vertical movement is transmitted to the link 20 and the arm 22 to move the third cutting tool 6 toward or away from the rod material. Such movement of the third cutting tool 6 is controlled by the profile of the control cam 16. Similarly, the movements of the fourth cutting tool 7 and the fifth cutting tool 8 toward or away from the rod material are controlled by control cams 25, 25' respectively, which are also mounted on the cam shaft 12. Now, the construction of a drilling tool will be described hereunder. As shown in FIG. 4, a tool mounting shaft 26 is provided in alignment with the axis of the rod material 9. This tool mounting shaft 26 is constantly biased backward by a spring or the like (not shown) and has a drilling tool 27 mounted therein. An arm 28 is pivotably mounted on a pivot pin 29, with one end located opposite to the rear end of the tool mounting shaft 26. The other end of the arm 28 is provided with a pin 31 which is in sliding engagement with the cam surface of a barrel cam 30. A tool mount 32 in which the tool shaft 26 is mounted, has another tool shaft 33 mounted therein, and this tool mount 32 is pivotable about a pivot pin 34 as shown in FIG. 5. An arm 35 is connected to the tool mount 32 at one end and the other end of the arm 35 is provided with a cam follower 36, which is held in pressure engagement with a cam 37 under the biasing force of a spring 38, the cam 37 being fixedly mounted on the cam shaft 12. Thus, it will be seen that when the cam shaft 12 is driven, the tool mount 32 is pivoted about the pivot pin 34 by the cam 37 to bring either the tool shaft 26 or 33 into axial alignment with the rod material 9. Further, the arm 28 is pivoted about the pivot pin 29 by the barrel cam 30 and pushes the tool shaft 26 or 33 from the backside by one end thereof, so that the drilling tool mounted in the tool shaft is pressed against the end face of the rod material 9 to drill a hole therein.

The rod material is controlled as follows:

In order to keep the rod material rotating and to effect forward or backward movement of the rod material in relation with the respective tools, use is made of a mechanism called material feeder. This material feeder is generally indicated at 39 in FIG. 6. The rod material 9 is extended through the material feeder 39 and gripped therein by a collet chuck 40. The collet chuck 40 is operatively connected with a motor 44 through a pulley 41, a belt 42 and a pulley 43, to be driven thereby. On the collet chuck 40 is mounted a ring 45 which tighten the collet chuck 40 around the rod material 9 when moved in the direction of the arrow *d* and releases the same from the rod material when moved in the opposite direction. The horizontal movement of the ring 45 is effected by a cam 46 which is mounted on the cam shaft 12 and operates a cam follower 47 which is operatively connected to the collet chuck through arms 48, 49. Therefore, whether the collet chuck 40 grips the rod material or releases it is determined by the configuration of the cam 46. The rod material 9 can be moved in the direction of the arrow *e* in FIG. 6, by pushing the material feeder 39 in the same direction by an arm 50 against the biasing force of a spring 51, with the rod material being gripped by the collet chuck 40. The arm 50 is connected at one end to the material feeder 39 and caused to make a pivotal movement by a cam 52 which is mounted on the cam shaft 12 and held in engagement with a cam follower 53 provided at the other end of said arm 50.

As will be apparent from the foregoing description, the conventional Swiss-type automatic lathe is so constructed that the axial movements of a plurality of cutting tools toward and away from the rod material and the feeding of the rod material are all effected by a number of cams mounted on a single cam shaft 12. Therefore, it had the disadvantage that the configurations of the respective cams become complicated as the final configuration of the desired part becomes complicated, which rendered the design and manufacture of the cams difficult and even made it impossible to produce the cams in such complicate configurations due to the limited diameters of the cams. Another disadvantage is that all of the cams must be replaced with new ones every time when the type of the parts to be obtained is changed. Therefore, while the lathe may be used expense-wise for the production of a parts in a quantity as large, for example, as 10,000 or more, it cannot be used for the production of the parts in a leaser quantity because the preparatory expense and time are too large to make the business profitable.

The present invention aims to obviate the foregoing disadvantages of the prior art automatic lathes. Namely, the first object of the invention is to provide an automatic lathe which is so designed that a working information fed thereto externally is converted into an electric signal and a drive source is controlled by the electric signal, whereby the movements of a rod material to be worked and cutting tools for working the rod material are suitably controlled and a parts of desired configuration is obtained.

Another object of the invention is to provide an automatic lathe of the character described above, wherein cam plates each having a cam surface in the shape of an Archimedes curve in cross-section are mounted on a shaft driven from the drive source, while cam followers are provided on the driven elements such as the cutting tools and held in engagement with the cam surfaces of the cam plates respectively, so that the driven elements may be moved in proportion to the angle of rotation of the shaft, and the angle of rotation of the drive source is controlled, whereby the driven elements are moved precisely by the desired dimensions respectively.

Still other object of the invention is to provide an automatic lathe of the character described above, wherein the cam surface of each of the cam plates consists of a relatively small diameter portion defining an Archimedes curve of larger curvature and a relatively large diameter portion defining an Archimedes curve of smaller curvature, whereby the cutting tools are quickly moved toward the rod material when the rod material is to be worked and are held remote from the rod material when the rod material is not to be worked.

Yet still other object of the invention is to provide an automatic lathe of the character described above, wherein each of the cam followers in engagement with the cam surface of the associated cam plate is slidably mounted on an arm connected to the associated driven element, and the cam follower and said arm are operatively secured to each other by means of a clutch mechanism which is actuated by the electric signal, whereby the driven element is operated or stopped accurately according to the working information.

Yet other object of the invention is to provide an automatic lathe of the character described above, wherein means for detecting the state of engagement or disengagement of the clutch mechanism is provided so as to prevent a plurality of cutting tools from being fed concurrently toward the rod material and colliding against each other.

Yet other object of the invention is to provide an automatic lathe of the character described above, wherein a cutting tool mount rockably mounted on a pivot pin and having a pair of cutting tools fixed thereto is provided with two cam followers, while cam plates each having a cam surface in the shape of an Archimedes curve in cross-section are mounted on a common rotary shaft for engagement with the respective cam followers in such a manner that the cam surfaces thereof are opposite to each other in the direction of inclination, one of the cam followers being fixed to the rockable cutting tool mount and the other one of the cam followers being mounted to the rockable cutting tool mount through a clutch mechanism, whereby cam plates of the same size as the cam plates for the other cutting tools can be used for operating the pair of cutting tools and the rockable cutting tool mount can be operated without using a cam plate of particularly large size.

Further object of the invention is to provide an automatic lathe of the character described above, wherein two drive sources are provided, of which one is used to cause an axial movement of a material feeder having a rod material to be worked securely gripped therein and another one is used to move a plurality of cutting tools provided in confronting relation to the rod material, both of the drive source and clutch mechanisms provided for the respective cutting tools being operated according to a working information, whereby a parts in conformance to the working information is obtained.

Yet further object of the invention is to provide an automatic lathe of the character described above, wherein an origin switch is provided in an incremental-open loop type electrical control means adapted to control the drive source upon reading the working information, so as to detect the position of the origin each time when one parts has been completed, and the angle of rotation of the drive source is controlled based on the position of the origin, whereby even if a step error occurs in the electrical control means through some unexpected reasons during working, it will not be accumulated in the following parts.

Still another object of the invention is to provide an automatic lathe of the character described above, wherein whether or not the parts has been worked precisely in accordance with the working information is checked by comparing the numerical value of the working information and the numerical value of the signal obtained on rotation of a driven element operating shaft with each other, using the origin switch.

Still other object of the invention is to provide an automatic lathe of the character described above, wherein, in order to preclude the actual dimensions of the worked parts from becoming larger or smaller than the numerical values of the working information, which is possible due to wear of the cutting edge of the cutting tool or attachment of a foreign material to the cutting edge of the same even if the cutting tool is fed precisely, means is provided to actually measure the dimensions of the worked parts and adjust the numerical values of the working information by an amount corresponding to the error, so that a parts of accurate dimensions may always be obtained.

Yet other object of the invention is to provide an automatic lathe of the character described above, wherein discrimination chutes are selectively positioned below a parts dropping position by the function of solenoids which are actuated by the working information and a signal representative of good or bad of a worked parts checked according to a check instruction, whereby the worked parts are automatically discriminated by the type and quality.

Still other object of the invention is to provide an automatic lathe of the character described above, wherein a drill mount movable toward the end face of the rod material is rotatably supported by an arm operated from the drive source and a plurality of drilling tools are mounted in said mount, the tool mount being rotated by a solenoid operated according to the working information, whereby the drilling tools are selectively positioned in a working position to work the end face of said rod material.

Still other object of the invention is to provide an automatic lathe of the character described above, wherein a collet chuck is provided in the material feeder and opened or closed by a solenoid which is operated according to the working information, whereby the rod material is positively gripped by released from the collet chuck.

The present invention will be described in detail hereinafter with reference to the accompanying drawings, in which.

An embodiment of the present invention will be described with reference to FIGS. 7 to 25.

The automatic lathe of the present invention is generally composed of a machine tool unit to transmit the drive of a drive source to cutting tools and a rod material, and a control unit to control the operation of the machine tool unit.

Of these two units, the machine tool unit will be explained at first hereunder: The machine tool unit is further broadly divided into a material feeder unit and a cutting tool mounting unit.

Figure 1:
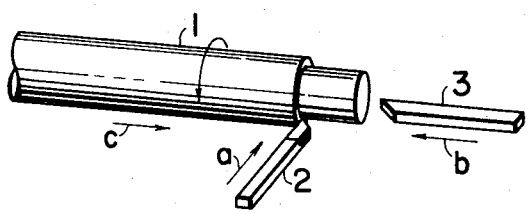
FIG. 1 is a diagram showing the basic relative position of a rod material and cutting tools in normal turning operation.
Figure 2:
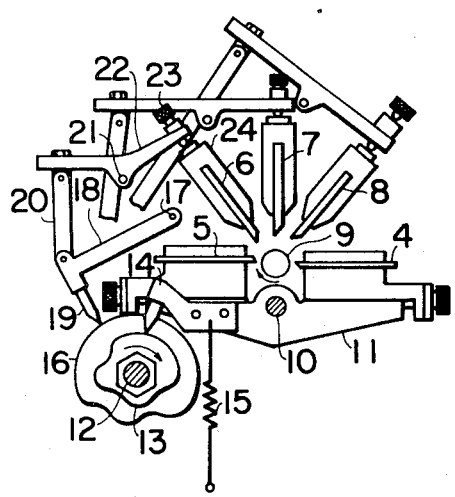
FIG. 2 is a view showing the essential portion of a conventional Swiss-type automatic lathe as viewed in the axial direction of a rod material.
Figure 3:
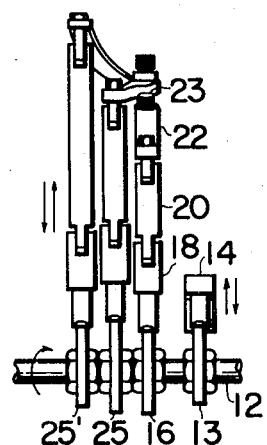
FIG. 3 is a side view of the portion shown in FIG. 2.
Figure 4:
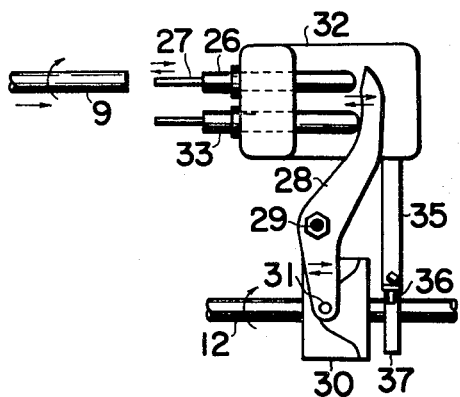
FIG. 4 is a top plan view of a drill mount in the conventional Swiss-type automatic lathe.
Figure 5:
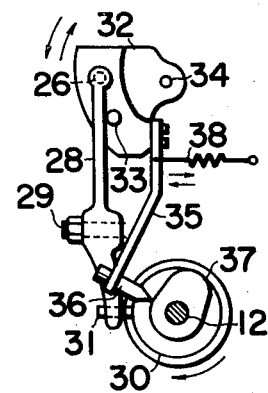
FIG. 5 is a back view of the drill mount.
Figure 6:
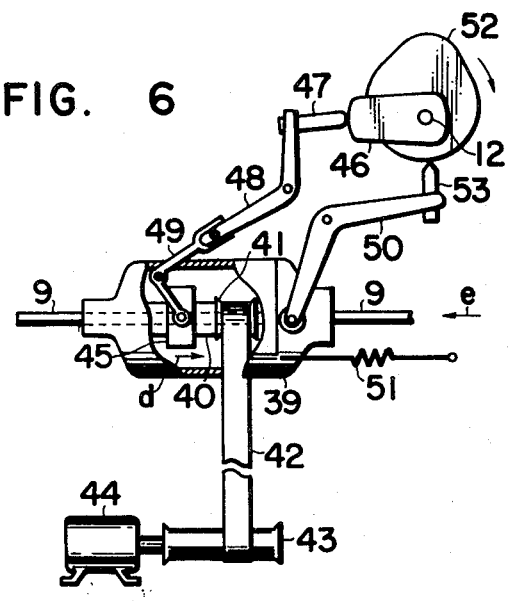
FIG. 6 is a side view, partially broken away; of a material feeder portion of the conventional Swiss-type automatic lathe.
Figure 7:
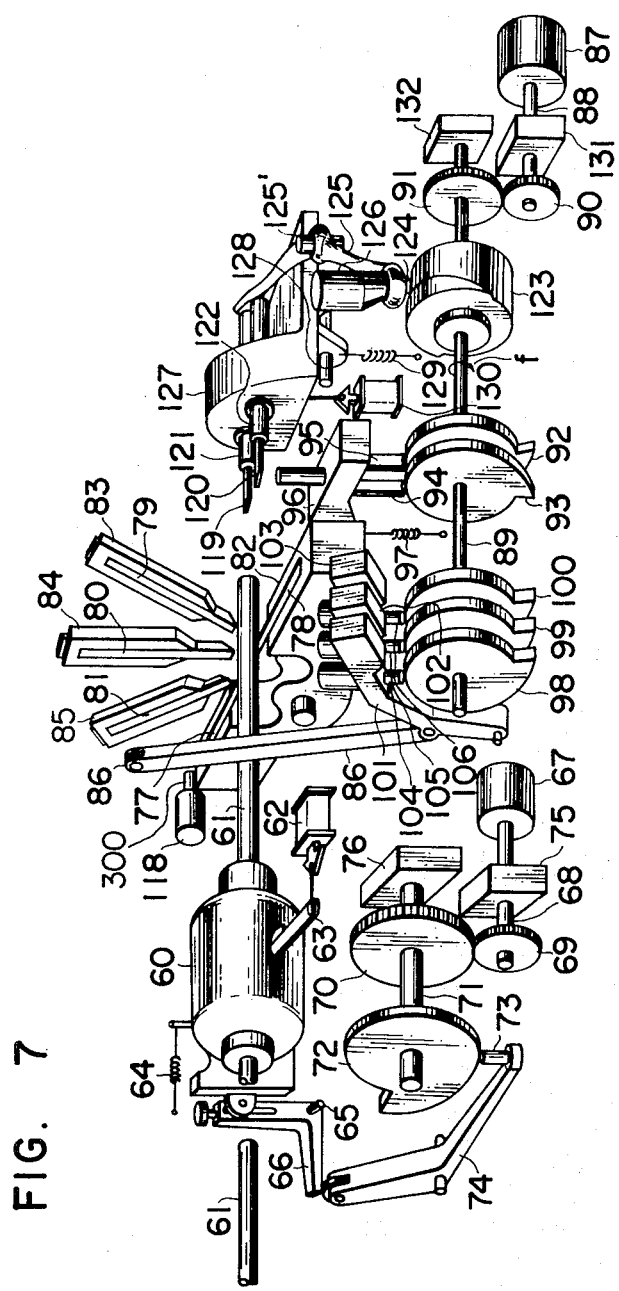
FIG. 7 is a view showing briefly the entire construction of an embodiment of the automatic lathe according to the present invention.

Referring to FIG. 7, numeral 60 designates a material feeder. Although a collet chuck to grip or release an elongate rod material 61 and a motor to impart rotation to the rod material are not shown, they are essentially same as those used in the conventional Swiss-type automatic lathe and a description thereof will be omitted. The material feeder unit of the invention differs from that of the conventional Swiss-type automatic lathe, in the manner of operating a ring (not shown) provided around the collet chuck and the manner of operating the material feeder 60. Namely, in the present invention, use is made of an electromagnetic coil 62 to operate the ring, and an arrangement is made such that when the electromagnetic coil 62 is energized, an arm 63 is pulled and thereby the ring is moved to cause the collet chuck to grip the rod material 61, whereas when the electromagnetic coil 62 is de-energized, the arm 63 is returned to the original position as by a spring, whereby the collet chuck releases the rod material 61. The material feeder 60 is constantly biased backward by a spring 64 so as to eliminate a back-lash, and is moved forward against the biasing force of the spring 64 by an arm 66 pivoted on a pin 65. A stepping motor 67 is used as a drive source for the material feeder. Namely, the drive of the stepping motor 67 is transmitted from the drive shaft 68 of the motor to a cam shaft 71 through intermeshing gears 69, 70, to rotate a linear cam 72 mounted on the cam shaft. The rotating linear cam 72 causes a movement of a cam follower 73 in engagement with the cam surface of the linear cam and the movement of the cam follower 73 is transmitted to the arm 66 through an arm 74. Thus, the material feeder 60 is moved by the arm 66.

The linear cam 72 is an essential element in the present invention and will be described in further detail hereunder. The linear cam 72 is so designed that the lift (inclination) of the cam surface is in a fixed proportional relation with the angle of rotation. Namely, the cam surface of the cam 72 has an Archimedes curve. In this specification, a cam such as the cam 72 whose cam surface defines an Archimedes curve is referred to as linear cam.

Numeral 75 designates an origin detector provided on the drive shaft 68 of the motor 67, which serves to determine the position of the material feeder 60 when the material feeder is to be returned to its original position upon completion of working of one parts, and the construction and function of the origin detector will be described later. Numeral 76 designates a limit switch provided on the cam shaft 71, to detect the angle of rotation of the cam shaft 71, and the construction and function of the limit switch will be described later.

Now, the cutting tool mounting unit will be described. As shown in FIG. 7, a first cutting tool 77, a second cutting tool 78, a third cutting tool 79, a fourth cutting tool 80 and a fifth cutting tool 81 are arranged radially of the rod material 61. The first cutting tool 77 and the second cutting tool 78 are mounted on a rockable tool mount 82, while the third cutting tool 79, the fourth cutting tool 80 and the fifth cutting tool 81 are mounted on cutting tool mounts 83, 84 and 85, respectively. The tool mounts 83, 84 and 85 are operated by links 86 (only one being shown) and arms (not shown) as in the conventional Swiss-type automatic lathe. In the present invention, however, the way in which the rockable tool mount 82 and the tool mounts 83, 84 and 85 are operated is different from that in the conventional Swiss-type automatic lathe. Namely, in the present invention the drive shaft 88 of a stepping motor 87 and a cam shaft 89 are operatively connected with each other by intermeshing gears 90, 91, and linear cams 92, 93 for operating the rockable tool mount 82 are mounted on the cam shaft 89 in such a manner that the lifts thereof are in opposite directions to each other. The cam surfaces of the linear cams 92, 93 are in engagement with cam followers 94, 95 respectively which provided on an arm 96 connected to the rockable tool mount 82. In this case, the cam follower 94 is fixed to the arm 96, whereas the cam follower 95 is connected to the arm 96 through a clutch mechanism to be described later, in such a manner that it is slidable relative to and can be fixed to the arm 96. The rockable tool mount 82 is constantly biased by a spring 97 to rotate clockwise unless the rotation is restricted by a stopper 118. Therefore, either the cam followers 94 or 95 is held in engagement with the linear cam 92 or 93. Describing the operation of the rockable tool mount 82 in further detail, when the cam follower 95 is secured to the arm 96 by the clutch mechanism, during retation of the cam shaft 89 in normal direction or in the direction of the arrow f, the rockable tool mount 89 is rotated by the cam surface of the linear cam 92, so that the second cutting tool 78 is brought into contact with the rod material 61 to turn the same. Similarly, when the clutch mechanism is held in a disengaged position during rotation of the cam shaft 89 in the direction of the arrow f, cam follower 95 is slidable relative to the arm 96 and the rockable tool mount 82 is rotated in an opposite direction by the cam follower 94 and the linear cam 93, so that the first cutting tool 77 is brought into contact with the rod material 61 to turn the same.

When a solenoid for the stopper 118 is in the de-energized state, the rockable tool mount 82 abuts against the stopper 118 under the biasing force of the spring 97 and is held horizontally. However, when the solenoid is energized and the pin of the stopper 118 is retracted, the rockable tool mount 82 is released from the stopper and rotated under the biasing force of the spring 97, so that either the cam follower 94 or 95 are brought into engagement with the linear cam 93 or 92. The linear cam 93 is for controlling the movement of the first cutting tool 77 and the linear cam 92 is for controlling the movement of the second cutting tool 78. The use of two linear cams for controlling the corresponding cutting tools as described above is one of the characteristic features of the present invention. Because if only one cam is used for causing a rocking motion of the rockable tool mount, an arrangement must be made such that the rockable tool mount is held in a horizontal position when the cam follower is located at an intermediate point of the portion of the cam surface from the valley to the crest of the cam surface, and the half of the portion from the intermediate point to the crest is used for controlling the second cutting tool, whereas the other half of the same is used for controlling the first cutting tool. Thus, only a half of the revolution of the cam shaft can be used for the control of the respective cutting tools and accordingly the controllable range becomes small. As contrasted, when two linear cams are used as in the present invention, one full revolution of the cam shaft can be used for the control of the respective cutting tools.

Figure 8:
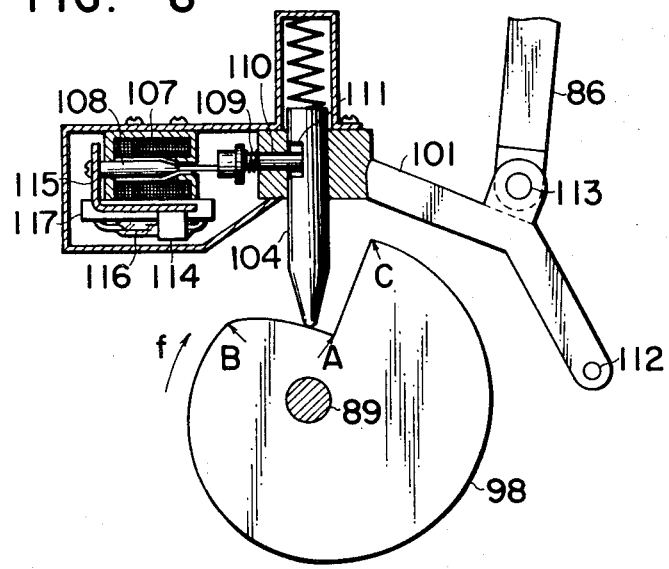
FIG. 8 is a front view, partially broken away, of the position correcting mechanism in the automatic lathe of FIG. 7.

On the cam shaft 89 are also mounted linear cams 98, 99 and 100 for controlling the tool mounts 83, 84 and 85, respectively, and cam followers 104, 105 and 106 each provided on an arm through a clutch mechanism are in engagement with the cam surfaces of the linear cams 98, 99 and 100, respectively. The relationship between the linear cams 98, 99, 100 and the cam followers 104, 105, 106 constitutes an essential feature of the invention and, therefore, will be described in detail with reference to FIG. 8. Referring to FIG. 8, there is shown the relationship between the linear cam 98 and the cam follower 104. The arrangement of other linear cams 99, 100 and cam followers 105, 106 is the same as that of FIG. 8 and will not be described herein.

The linear cam 98 is so designed that the angle of rotation and the lift (inclination) of the cam surface are in proportional relation to each other, and the lift thereof is formed in two steps. Namely, the linear cam 98 has a cam surface which consists of two different Archimedes curves. As will be seen in FIG. 25 which shows the principle of the linear cam, the inclination of the portion of the cam surface from a point A to a point B is made constant relative to the angle of rotation and is also made steep and the inclination of the portion from the point B to a point C is also made constant relative to the angle of rotation but is made gradual relative the inclination of the portion from the point A to the point B. In practice, the cam surface of the linear cam 98 is so shaped that the portion from the point A to the point B has a lift of 0.1 mm for each angle of rotation of 1° and the portion from the point B to the point C has a lift of 0.02 mm for each angle of rotation of 0.3°. The rotating speed of the stepping motor 87 is reduced by the gears 90, 91 such that the cam shaft 89 having the linear cam 98 mounted thereon will rotate 0.3° for every one step rotation of the stepping motor. The stepping motor 87 rotates one step each time one electric pulse is given thereto. FIG. 8 shows that the clutch mechanism is in the engaged position. Namely, a clutch coil 107 is energized and an armature 108 is held in a retracted position while pushing a clutch pin 110 against the biasing force of a spring 109, so that the other end of the clutch pin 110 is received within a notch 111 formed in the cam follower 104. When the linear cam 98 is rotated in the direction of the arrow $f$ under such condition, the cam follower 104 is lifted and causes the arm 101 to rotate about a pivot pin 112, through the engagement with the clutch pin 110. The rotation of the arm 110 is transmitted to the link 86 through a pivot pin 113 and thence to the tool mount 83 through a separate arm, to move the third cutting tool 79 toward the rod material 61. In this case, the ratio of the distance from the pivot pin 112 of the arm 101 to the pivot pin 113, to the distance from the pivot pin 112 to the tip of the cam follower 104 is made 1 : 2 for enhancing the precision. Therefore, the tool mount 83 moves 0.01 mm on every one step rotation of the stepping motor 87.

Further, when the cam follower 114 is in engagement with the portion of the cam surface of the linear cam 98 from the point A to the point B, the lift of the cam follower 114 is large relative to the angle of rotation of the linear cam 98 and, therefore, the third cutting tool 79 is quickly moved toward the rod material 61. Namely, when the cam follower 104 is at a point adjacent the point A, the third cutting tool 79 is held remote from the rod material 61. This is for the purpose of preventing the chip, produced by turning of the rod material 61 by the other cutting tool, from wrapping around the third cutting tool 79. The lift of the portion from the point A to the point B is made large so that the third cutting tool 79 may quickly be fed over such a remote distance and the operation efficiency may be enhanced. When the cam follower 98 has reached the point B, the third cutting tool 79 is positioned very close to the rod material 61, and tehreafter the cam follower 104 is displaced at a low speed according to the small lift of the linear cam 98 provided by the portion beyond the point B. Therefore, the third cutting tool 79 is fed slowly toward the axis of the rod material 61 to turn the rod material. Furthermore, the arrangement is made such that the clutch pin 109 is disengaged from the notch 111 of the cam follower 104 only when the cam follower is located at the point A and is inserted into the notch only when the cam follower is located adjacent the point A. This means that the next other cutting tool is not allowed to be fed unless the working cutting tool is sufficiently retracted and therefore collision of the cutting tools against each other is prevented. The linear cams 92, 93 also have a cam surface consisting of two types of inclination, similar to the linear cam 98 described above.

In FIG. 8, numeral 114 designates a magnet which is mounted on a plate 115 connected to the armature 108, in substantially opposed relation to a lead switch 116. This magnet 114 is a permanent magnet and operated at the same time when the armature 108 is attracted upon energization of the clutch coil 107, to actuate the lead switch 116. The lead switch 116 is opened when the armature 108 returns to its original position under the biasing spring 109. This lead switch 116 constitutes a detecting circuit to verify the operation of the clutch pin 110 and to prevent a phenomenone wherein two or more cutting tools are fed concurrently as a result of the clutches provided on the other cam followers being energized concurrently. Numeral 117 designates a bakelite plate for mounting the lead switch 116 thereon.

Referring back to FIG. 7, cutting tools 119, 120 for working the end face of the rod material 61 are operated in the following manner: Namely, these cutting tools 119, 120 are mounted in tool shafts 121, 122 respectively which are operated by a barrel cam 123 mounted on the cam shaft 89. The barrel cam 123 has a two-step linear cam surface and a cam follower 124 moves relative to the barrel cam along the cam surface, whereby an arm 125 is caused to make a pivotal movement about a pivot pin 125' and the tool shaft 121 or 122 is pushed by the other end of the arm 125. Thus, the cutting tool 119 or 120, mounted in the tool shaft 121 or 122, is pushed against the end face of the rod material to perform a work such as drilling. The cam follower 124 is controlled by a clutch 126.

Figure 9:
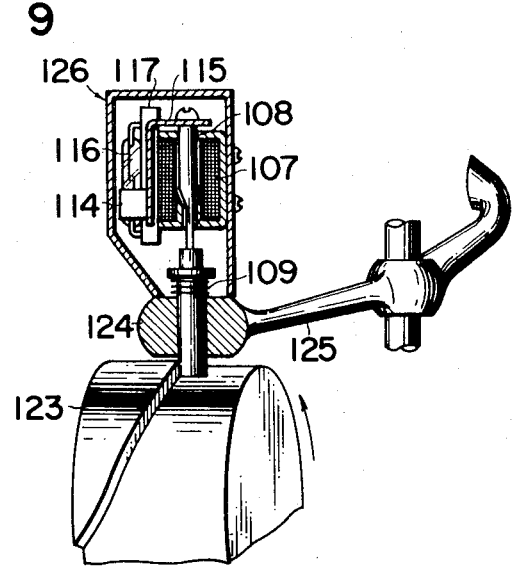
FIG. 9 is a perspective view of the position correcting mechanism of the automatic lathe for moving and controlling the drilling tool shaft, with a portion thereof broken away to show the essential portion.

The clutch 126 is, as shown in FIG. 9, essentially the same in construction and function as that of FIG. 8 and detailed description thereof will be omitted. The only difference is that in the clutch of FIG. 9 the clutch pin 110 of the clutch shown in FIG. 8 is used as the cam follower 124 as it is. Namely, when a coil 107 is energized, an armature 108 is attracted, so that the cam follower 124 is projected for engagement of the cam surface of the barrel cam 123 and the movement of the cam follower 124 is transmitted to the arm 125. On the other hand, when the current supply to the coil 107 is interrupted, the cam follower 124 is disengaged from the cam surface of the barrel cam 123 and hence the arm 125 is held stationary.

The tool shafts 121, 122 to be operated by the arm 125 are slidably supported in a drilling tool mount 127 which in turn is pivotably mounted on a pin 128. A spring 129 is anchored to one side of the drilling tool mount 127 with respect to the pin 128, to pull the tool mount, while a cutting tool selection solenoid 130 is provided on the other side of the tool mount 127. Therefore, when the solenoid 130 is not energized, the tool mount 127 is pulled by the spring 129 to locate the drilling tool 119 opposite to the end face of the rod material 61, whereas when the solenoid 130 is energized, the tool mount 127 is caused to rotate about the pin 128 by the solenoid 130 against the biasing force of the spring 129, to locate the drilling tool 120 opposite to the end face of the rod material 61. After the drilling tool 119 or 120 has been positioned opposite to the rod material 61 in the manner described, the tool shaft 121 or 122 is work can be performed on the end face of the rotating rod material.

The drive shaft 88 and the cam shaft 89 are provided thereon with an origin detector 131 and a limit switch 132 respectively which are identical in construction with the aforesaid origin detector 75 and limit switch 76.

Figure 10:
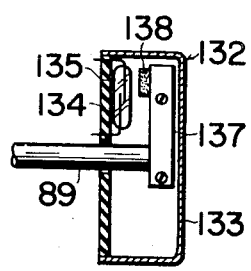
FIG. 10 is a vertical cross-sectional view of a limit detector.
Figure 11:
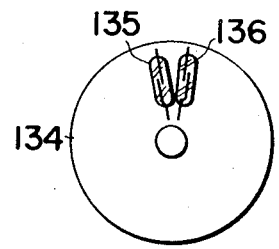
FIG. 11 is a view showing the arrangement of the lead switches used in the limit detector.

Now, description will be given on the limit switch 132 with reference to FIGS. 10 and 11. A linear cam always provides a large fall when rotated continuously in one direction and a steep upward gradient which cannot be followed, when rotated continuously in an opposite direction. Namely, that is the portion between the point A and the point C in FIG. 8. Since this portion of the cam surface cannot be used, it becomes necessary to provide limit switches immediately before the point A and the point C, to emit a signal to stop the stepping motor. For convenience of explanation, the former is called retraction limit and the latter is called advance limit. The limit switch 132 includes a box-shaped housing composed of a cover 133 and an insulating plate 134 and the box-shaped housing is securely mounted on the cam shaft 89. On the insulating plate 134 are provided a lead switch 135 for advance limit and a lead switch 136 for retraction limit. An arm 137 is fixed to the cam shaft 89 and a magnet 138 is fitted to the arm at a location opposite to the lead switches 135 and 136. The limit switch 132 of the construction described above operates in such a manner that, when the cam shaft 89 is rotated in normal direction and the magnet 138 carried thereon approaches the lead switch 135, the contacts of the lead switch 135 are closed to stop the rotation of the stepping motor 87, and when the magnet 138 approaches the lead switch 136, the contacts of the lead switch are closed to stop the rotation of the stepping motor 87.

Figure 12:
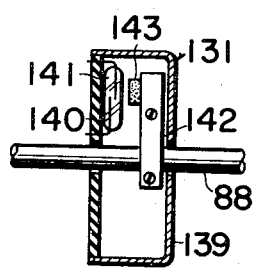
FIG. 12 is a vertical corss-sectional view of an origin detector.
Figure 13:
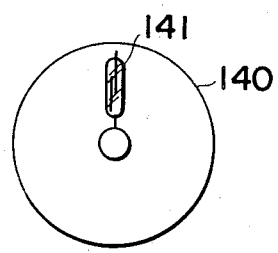
FIG. 13 is a view showing the arrangement of the lead switches of the origin detector.

Next, description will be given on the origin detector 131 with reference to FIGS. 12 and 13. The origin detector 131 includes a box-shaped housing composed of a cover 139 and an insulating plate 140, and the box-shaped housing is fixedly mounted on the drive shaft 88 of the stepping motor 87.

The insulating plate 140 is provided thereon with a lead switch 141, while an arm 142 fixed on the drive shaft 88 is provided thereon with a magnet 143 so as to be opposed by the lead switch 141. Therefore, when the drive shaft 88 is rotated and the magnet 143 approaches the lead switch 141, the contacts of the lead switch are closed and a signal is emitted which is an origin signal. This origin signal is emitted at a position opposite to the point B of the linear cam 98, and the angle of rotation of the drive shaft 88 is determined based on this position. The lift of the linear cam 72 is one step and, therefore, the origin signal is emitted at a point adjacent the stepped portion.

Figure 14:
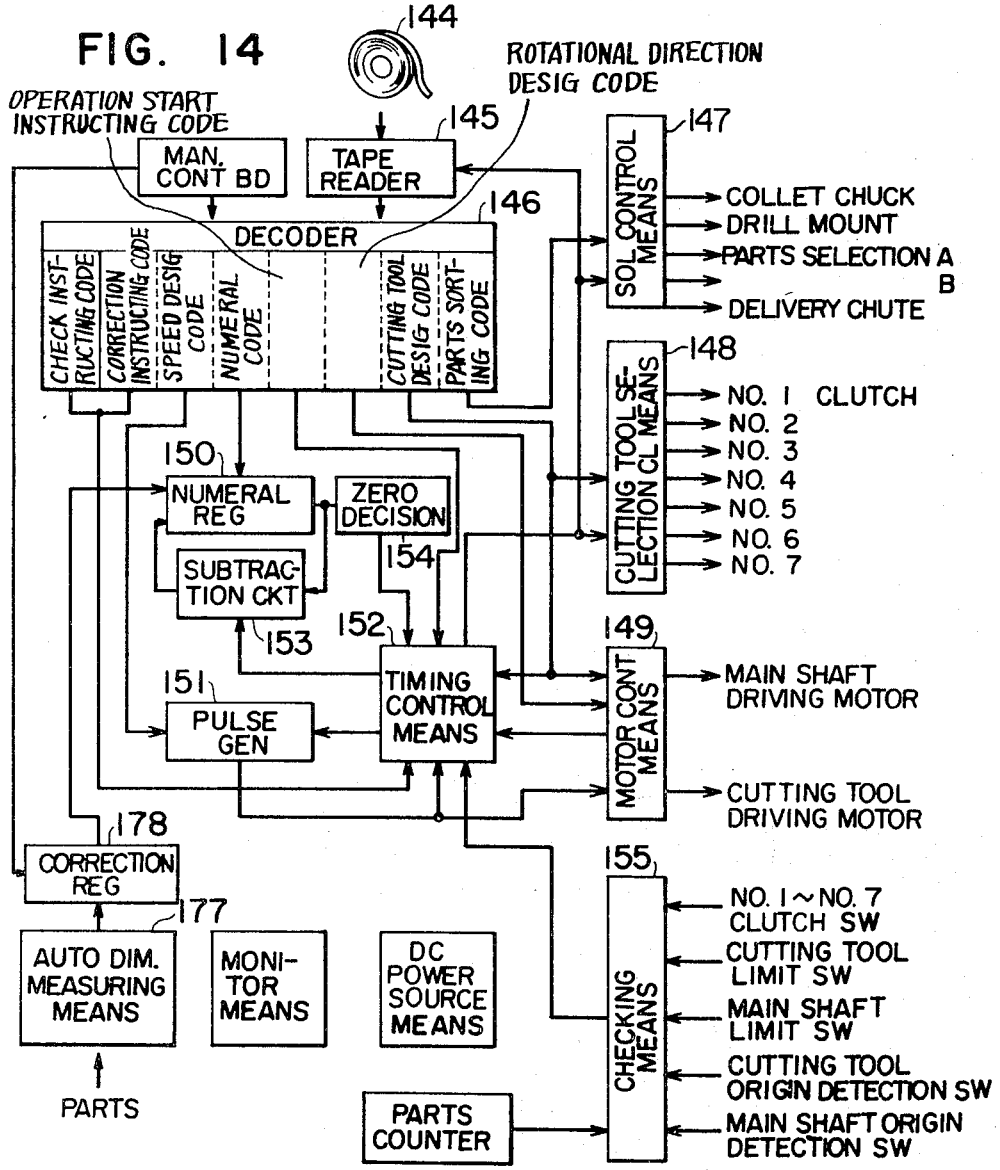
FIG. 14 is a block diagram showing the control system of the automatic lathe.

Hereinabove, the construction of the machine tool unit has been described. The control unit will now be described hereunder:

The construction of the control unit is as shown in the block circuit diagram of FIG. 14. The lines going out from and coming into the block circuit diagram are all connected to the electric elements of the machine tool unit respectively for transmission of electric signals therethrough to perform a turning operation automatically. The operations of the respective blocks will be explained in sequence hereinafter. First of all, a paper tape 144 is provided therein with perforations representing the controlling information which is indicated in terms of predetermined numerals, alphabets or symbols. When a tape reader 145 reads the tape 144, all the information thus read is fed to a decoder 146, wherein the information is sorted by the type of the code signified by the information. In case when the information is a parts sorting code, a solenoid control means 147 is actuated to energize a parts discrimination solenoid to be described later. In case when the information is a cutting tool designating code, a cutting tool selection clutch control means 148 is actuated to operate a pertinent cutting tool selection clutch. The code is further fed to a motor control means 149, which in turn issues an instruction to operate either the main drive shaft driving motor or the cutting tool operating motor. In case when the information is a rotational direction designating code, the code signal is fed to the motor control means 149, which in turn switches the motor operating circuit from normal rotation to reverse rotation or vice versa. A numeral code is set in a numeral register 150 to be memorized therein, the numeral register is of the type of four digit of decimal numbers. A speed designating code acts on a pulse generator 151 to determine the frequency of the pulse generated thereby. This pulse is a step pulse to operate the stepping motor and the frequency thereof determines the rotational speed of the motor. A correction instructing code is fed to a timing control means 152 to effect a positional correction to be described later. An operation start instructing code is fed to the timing control means 152 and a numerical control operation is commenced only after the timing control means receives the said code.

Namely, when the operation start instructing code enters the timing control means, a signal is given to the tape reader to stop its operation and successively thereafter a pulse generating instruction is given to the pulse generator 151, whereby the pulse generator starts to generate pulses continuously. The first one pulse is fed to the motor control means 149 to rotate either the stepping motor for the main drive shaft or the stepping motor for the cutting tool one step in the direction previously designated. The first pulse is also fed to the timing control means 152 and thence to a substraction circuit 153 to subtract "1" from the numeral memorized in the numeral register 150. For instance, when the numeral memorized in the numeral register 150 is "100," it becomes "99" and this numeral "99" is memorized in the numeral register. The numeral memorized in the numeral register is transmitted to a zero decision circuit 154 on each subtraction of the numeral but no signal will be emitted from the zero decision circuit 154 unless the numeral becomes zero. When the next pulse is generated from the pulse generator 151, the stepping motor is rotated one step and at the same time numeral "1" is subtracted from the numeral memorized in the numeral register 150 by the function of the subtraction circuit 153, as described above. When the numeral memorized in the numeral register 150 becomes zero upon repetition of such operation, a signal is emitted from the zero decision circuit 154 and fed to the timing control means 152 to stop the operation of the pulse generator 151. The pulse generator 151 thus stopped no longer generates a step pulse, so that the stepping motor stops rotating. Therefore, if the numeral initially set in the numeral register 150 is "100" or 1 mm, the stepping motor has been rotated 100 steps and the cutting tool mount associating with the clutch which has been in an "ON" position in this case, has been moved 1.00 mm.

Upon completion of one process as described above, a signal is sent from the timing control means 152 to the tape reader 145 to cause it to read the next information and thereby to carry out a new process. Thereafter, such operation is repeated to complete a finished parts. Where it is desired to obtain a large number of parts of the same type, it is only necessary to feed the paper tape to the tape reader in the form of endless loop repeatedly.

Now, the basic operation of the numerical control unit will be described by way of practical example. For a process of feeding the fifth cutting tool 81 a distance of 1.23 mm at the rate of 300 pulses/second, the paper tape 144 is perforated as follows:

T5 S3 + 123 CR

These symbols are read by the tape reader 145 one after another. First of all, "T" is read by the tape reader and a signal representative of "T" is sent to the decoder 146, indicating that the successive numeral "5" is a cutting tool designating code. Then, numeral "5" is read by the tape reader, whereupon the cutting tool selection clutch control means 148 is actuated to energize the clutch for the fifth cutting tool 81. Thus, the clutch pin is projected and the clutch is placed in an "ON" position. At the same time, the motor control means 149 is actuated to energize the circuit which operates the stepping motor 87 for the cutting tool. The character "S" is read by the tape reader and a signal representative of "S" is sent to the decoder 146, indicating that the following numeral is a speed designating code. Then, numeral "3" which follows is read by the tape reader and a signal representative of "3" is sent to the pulse generator 151, whereby the circuit of the pulse generator is set to generate pulses at the rate of 300 pulses/second. Then, the symbol "+" is read by the tape reader and a signal thereof is fed to the decoder 146. The decoder 146 identifies the "+" symbol as a rotational direction designating code and the motor control means 149 forms a circuit to rotate the stepping motor in normal direction. Since the decoder knows that the numeral following the symbol "+" is a numeral which controls the position of the cutting tool, numeral "1" fed successively to the said symbol is set in the lowest digit position of the numeral register 150. When numeral "2" is read which follows numeral "1," the numeral "1" is shifted to the next higher digit position and numeral "2" is set in the lowest digit position of the numeral register 150. Similarly, when the next numeral "3" is read, the numeral "3" is plated in the lowest digit position of the numeral register 150 and numerals "1" and "2" are shifted to the next higher digit position respectively. Thus, numeral "123" is memorized in the numeral register. A code "CR" which is to be read next is an operation start instructing code and the timing control means 152 starts to operate upon receiving a signal representative of the code "CR". Namely, the pulse generator 151 emits pulses one after another and the stepping motor 87 continue to rotate in normal direction. The rotation of the cam shaft 89 and the linear cam 100 is transmitted to the arm 103 and thence to the fifth cutting tool 81 to cause the latter to cut the rod material 61. When the numeral memorized in the numeral register 150 becomes zero, the pulse generator 151 ceases its operation and the stepping motor 87 stops precisely, even from a high speed because it has a large holding property, and generates a large braking force. Therefore, the fifth cutting tool 81 is positively held in a position 1.23 mm from its initial position.

The numerical control system described above belongs to the incremental open loop type and hence a step error occurring under some conditions is accumulated. The automatic lathe according to the present invention is provided with means to eliminate such error. Namely, according to the invention, the error is eliminated by incorporating a correction instructing code in the paper tape in the form of perforations, which is also read by the tape reader.

Figure 15:
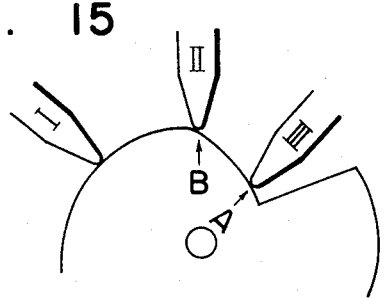
FIG. 15 is a diagram for explaining the operation of the position correcting mechanism.

First of all, when a correction instruction for the cam shaft 89 is read from the tape 144 and identified as a correction instruction by the decoder 145, the timing control means 152 controls a series of operations which will be explained with reference to FIG. 15. In the following explanation, it is considered that the cam is held stationary and the cam follower moves relative to the cam, for the convenience of explanation. The electrical connection is made such that when the cam follower is at a point A, the retraction limit switch is turned on, whereas when the cam follower is at a point B, the origin detector 131 is turned on. If a correction instruction is issued when the cam follower is in the position I relative to the cam, the pulse generator 151 and the motor control means 149 operate so as to cause a reverse rotation of the stepping motor 87 at a high speed and the retraction limit siwtch is placed in the "ON" position. This condition lasts until a signal is sent from a check means 155, shown in FIG. 14, to the timing control means 152. The signal passes through a portion where the origin detector is energized, but in this case the origin switch signal does not cause any action nor is the information memorized in the numeral register 150 changed.

Figure 16:
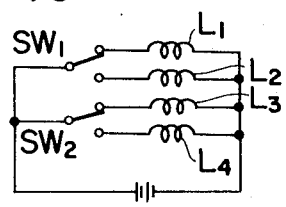
FIG. 16 is a circuit diagram for explaining the operation of a stepping motor.

Upon receiving the retraction limit switch signal, the motor control means 149 switches the circuit of the stepping motor 87 for normal rotation and the frequency of the pulse generated by the pulse generator 151 is lowered, so that the motor proceeds at an intermediate speed to a point where the origin detector is placed in an "ON" position. When the origin switch is turned on, the stepping motor 87 is stopped at a certain phase in the exciting phase thereof to effect the correction at a more accurate absolute position, whereby the correction is completed. This will be further explained with reference to the case when the stepping motor is a four-phase exciting motor as shown in FIG. 16. Referring to FIG. 16, symbols $L_1$, $L_2$, $L_3$ and $L_4$ designate exciting coils of the motor, respectively. The current supply to the exciting coils is regularly switched by two switches $SW_1$, $SW_2$ to rotate the motor stepwise in a predetermined direction.

Figure 17:
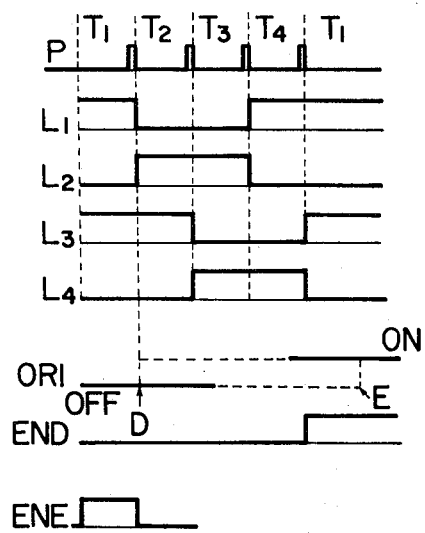
FIG. 17 is a timing diagram showing the current phase of the stepping motor and the operation of the origin switch.

In practice, the switching is effected by means of transistors. If the timing of the switching operation is determined by pulses P as shown in FIG. 17, the phases of the intermittend current passing through the respective coils are as indicated by the hatching. If the time $T_1$ is of the first phase, the times $T_2$, $T_3$ and $T_4$ are of the second, the third and the fourth phases. Suppose that the correction completion signal "END" is to be emitted in the first phase $T_1$ after the origin switch ORI has been turned on, the "END" signal is issued in the time $T_1$, no matter at what portion of the period from the point D to the point E of FIG. 17 the origin switch ORI has been turned on, and the stepping motor is stopped and the current continues to flow through the coils $L_1$ and $L_2$ only to produce a braking force. This means that the tool mount can be stopped in a fixed absolute position, even if the position in which the origin switch ORI is turned on is slightly variable within the range from the point D to the point E. In the present invention, such a stable and highly precise position correcting operation is effected at each time when the tool mount begin to move, and, therefore, a positional control free of error accumulation can be attained, though the system is of the open loop type.

The cam surface of the linear cam 72 to operate the material feeder 60 has a uniform lift and hence the point at which the origin switch is turned on is located near the point A. The positional correction of the material feeder 60 is performed in exactly the same manner as the positional correction of the cutting tool driving shaft. In this case, the collet chuck which holds the rod material 61, is opened to release the rod material, retracted and closed again upon completion of the correction, all by the function of the solenoid control means 147. Therefore, the rod material is gripped again always with a correct dimension, and by making use of such advantageous feature, it is possible to obtain a parts longer than the movable range of the material feeder 60.

In the present invention, the origin detection signal is used in another way, in addition to the way described above. Namely, whether the position selected under numerical control was correct or not is verified by utilizing the origin detection signal in the following manner: A check instructing code punched in the paper tape 144 is read by the tape reader 145 and the numeral thus read from the tape 144 is set in the numeral register 150 as a reference numeral. This reference numeral is the distance from the present position of the cutting tool to the origin, plus numeral 4 when the position of the cutting tool is correct. Then, the timing control means perform a series of operations to be described hereunder, in accordance with the operation start instructing code read by the tape reader 145.

Figure 18:
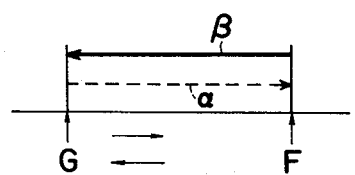
FIG. 18 is a diagram showing the operation of a cutting tool under numerical control.

In FIG. 18, the point F is the present position of the cutting tool and the point G is the origin. The dotted line $\alpha$ is the distance which the cutting tool has already moved under numerical control and the solid line $\beta$ is a reference distance which the cutting tool will move. First of all, the motor is set for reverse rotation from the present position F.

Then, the pulse generator 151 is actuated and the motor is rotated in response to the pulse generated by the pulse generator. At the same time, "$-1$" is subtracted from the numeral memorized in the numeral register 150, by the function of the subtraction circuit 153. When the motor continues to rotate and approaches the origin, it passes through the phases shown in FIG. 17, in the order of $T_1$, $T_4$, $T_3$, $T_2$ and $T_1$. The check completion signal "END" is emitted in the phase of $T_1$ which is the first phase after the origin signal "ORI" has disappeared. The pulse generator stops its pulse generating operation and the motor is also stopped, so that the subtraction is interrupted. This position is four steps reverse from the aforesaid correction point. However, since the reference numeral is the distance which the cutting tool moves to return to the origin, plus "4," the numeral memorized in the numeral register becomes zero at this position. Therefore, the correctness of the tool position is verified by a signal emitted by the zero decision circuit 154. If the numeral memorized in the numeral register 150 is minus, this means that more pulses than the correct number of pulses, corresponding to that required in the case of normal rotation, has been required and the point F has been selected beyond the correct position of the cutting tool. Conversely, if the numeral memorized in the numeral register 150 is plus, this means that the cutting tool has stopped before the point F. In either case, a corrective action is taken as will be described later.

In the present invention, as has been described above, means is provided to preclude an error in the positional control which is possible to occur unexpectedly in the incremental open loop system, in addition to the means to correct the origin described previously.

Figure 19:
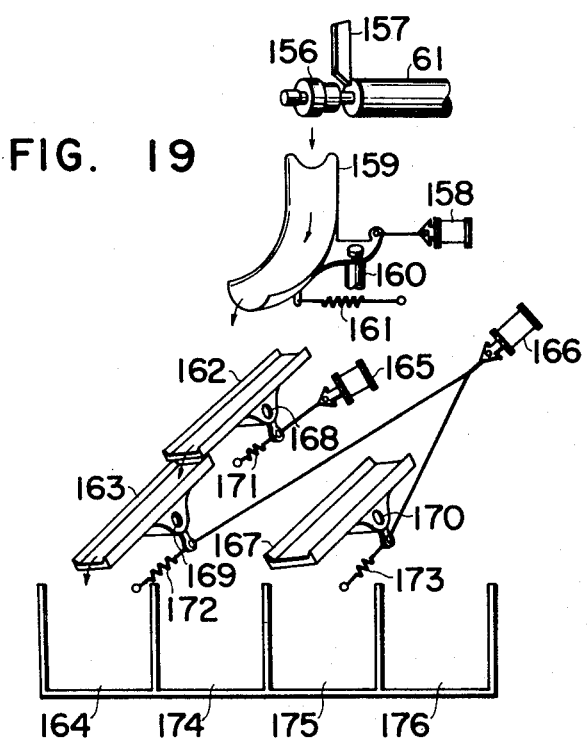
FIG. 19 is a view briefly showing the construction of a parts discriminating device.

Now, the manner of disposing the completed parts will be described hereinafter. The operation of removing the completed parts includes three steps, i.e., the step of separating the parts from the chips, the step of sorting the parts by the types and the step of removing defective parts. As shown in FIG. 19, the parts 156 produced by turning the tip of the rod material 61 is cut from the rod material by means of a cutting tool 157. In this case, a solenoid 158 is energized from the solenoid control means 147, to locate a parts delivery chute 159 in a position below the parts 156. Namely, the chute 159 is pivotably supported on a pin 160 and constantly biased by a spring 161 but is positioned below the parts by the action of the solenoid 158, only when the parts 156 is dropped. Therefore, the chip will not fall on the chute during normal turning operation of the lathe, and the parts are thus separated from the chip.

The parts 156 cut from the rod material drops and slides on the chute 159 and led onto a discrimination chute 162. If three discrimination chutes are in the positions shown in FIG. 19, the parts slides on the discrimination chutes 162, 163 and drops into a first pocket 164. The discrimination chutes 162, 163 and 167 are pivotably mounted on pins 168, 169 and 170 and pulled in the same direction by springs 171, 172 and 173 respectively. In the state shown in FIG. 19, the respective chutes are pulled and inclined by solenoids 165, 166 against the biasing forces of the springs. Thus, it will be seen that if the solenoid 166 is de-energized, the discrimination chutes 163, 167 will be inclined in the opposite direction and the parts will be received in a second pocket 174 by being guided by the discrimination chutes. Similarly, if the solenoid 165 is de-energized and the solenoid 166 is energized, the parts will be received in a third pocket 175. Further, if the solenoids 165, 166 are both de-energized, the parts will be received in a fourth pocket 176. Therefore, by suitably energizing the solenoids 165, 166 according to the information punched in the tape 144, the parts can be sorted by the types. However, if there is an error in the collation or a defective condition is detected by the check, the delivery chute 159 will become inoperative, even with the information incorporated in the tape 144, and the defective parts are discarded together with the chip.

In the turning of a large number of parts, the cutting tools will be worn out gradially or conversely the cutting edges of the cutting tools will be extended by the material attached thereto. Thus, it becomes necessary to compensate a change in cutting dimensions caused by such phenomenone. According to the present invention, an automatic dimension measuring means 177 is provided as shown in FIG. 14, to actually measure the dimensions of the parts. A dimensional error detected by the automatic dimension measuring means 177 is memorized in a compensation register 178 and the value memorized in the dimension measuring means is added to or subtracted from the numeral memorized in the numeral register 150, so as to compensate the dimensional error by changing the cutting tool control distance by a dimension corresponding to the dimensional change of the cutting edge.

Figure 20:
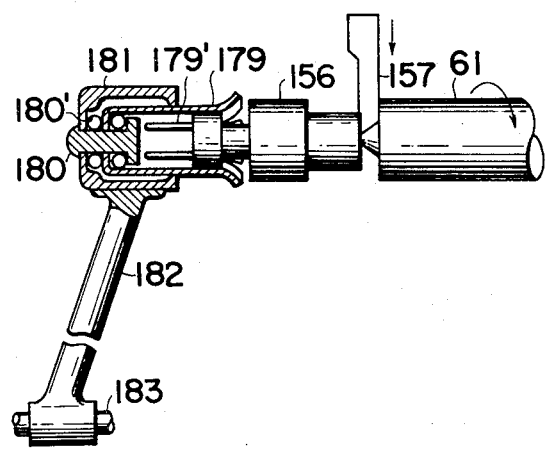
FIG. 20 is a side view, partially broken away, of a chuck by which a sample parts is taken out for measurement.
Figure 21:
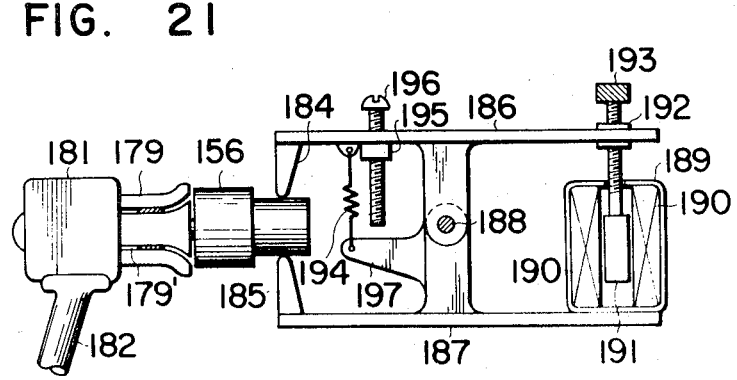
FIG. 21 is a side view of a parts measuring device.

The automatic dimension measuring means will be described in further detail hereunder: FIG. 20 shows the detail construction of a parts sampling mechanism for measuring the dimensions of a sample parts. In FIG. 20, the parts sampling mechanism is in a position immediately before the parts 156 is cut from the rod material 61 by the cutting tool. A chuck 179 is provided coaxially with the rod material 61, into which one end of the parts 156 is inserted as the rod material 61 is moved forward. As shown in FIG. 21, the chuck 179 consists of an elastic body having slits 179' formed therein and is rotatable with the parts because the parts 156 is still rotating when inserted into the chuck 179. Namely, the chuck 179 is rotatably mounted on a stationary shaft 180 through a large number of balls 180', which stationary shaft is fixedly connected to a cover 181 secured to an upper end of an arm 182. The arm 182 has its lower end pivotally mounted on a shaft 183.

Figure 22:
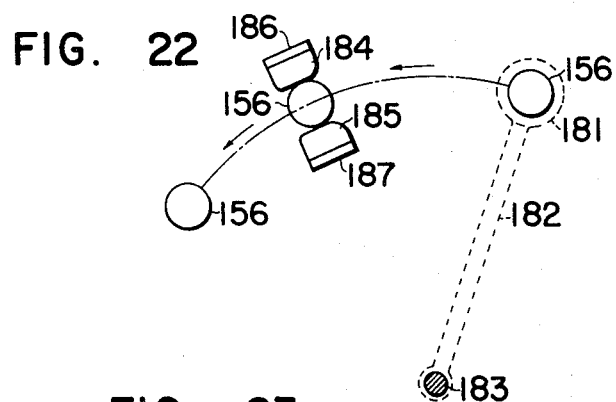
FIG. 22 is a diagram for explaining the operation of the parts measuring device.

After having been cut from the rod material 61, the parts thus supported by the chuck 179 is removed from the working position while being carried by the arm 182 along an arcuate locus as shown in FIG. 22. Two upper and lower contactors 184, 185 to measure the diameter of the parts 156 are provided at an intermediate position of the arcuate locus and the parts 156 passes through the interspace of the contactors while urging the contactors outwardly. The parts thus measured is then knocked out of the chuck 179, and the next parts is measured in the manner described.

A dimension measuring instrument having the aforesaid contactors 184, 185 comrpises two T-shaped arms 186, 187 connected together by a pin 188 into H-shape, for pivotal movement about the pin. The contactors 184, 185 are provided at one confronting ends of the arms 186, 187, while a differential transformer 189 is provided at the other ends. The differential transformer 189 has a coil 190 disposed therein and a cylinderical hollow is formed at the center thereof. A cylindrical core 191 of a magnetic material is removably disposed in the cylindrical hollow. This cylindrical core 191 is screw-threaded through a nut 192 provided on the arm 186 and is provided with a handle 193 so that the position thereof may readily be adjusted by rotating the handle. The arms 186, 187 are biased by a spring 194 to urge the contactors 184, 185 toward each other. However, the space interval between the contactors 184, 185 will not become smaller than a predetermined interval because a bolt 196 is provided on the arm 186 by a nut 195 for engagement with a stopper 197 provided on the arm 187.

Figure 23:
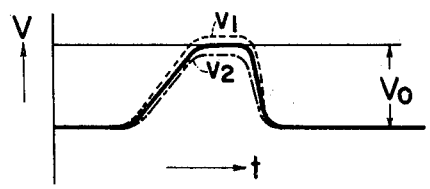
FIG. 23 is a diagram showing the output change of a differential transformer in the measurement of the dimensions of a parts.

When the bolt 196 is in contact with the stopper 197, the core 191 within the coil 190 is held in its upper position, whereas when the parts 156 is being measured by the measuring instrument as shown in FIG. 21, the core 191 is held in its lower position. Therefore, the vertical displacement of the core 191 can be taken out as a voltage change or current phase change. This will be explained with reference to FIG. 23. In FIG. 23, the axis of ordinate represents a change in electric signal (V) corresponding to a displacement of the core 191 and the axis of abscissa represents time ($t$). The time referred to here is the period in which the parts 156 passes between the contactors 184, 185 without stopping. Assuming that the magnitude of the electric signal during calibration of the measuring instrument by means of a parts of correct dimension or a gauge is V0 and a correction value at this time is zero, if the electric signal is changed as indicated by the solid line in FIG. 23 during actual measurement of a parts, the dimension of the parts is correct and the correction value is zero. However, if the electric signal is changed as indicated by the dotted line $V_1$, the dimension of the parts is larger, and conversely if the electric signal is changed as indicated by one-dot chain line $V_2$, the dimension of the parts is smaller.

A larger dimension means insufficient forward movement of the cutting tool, so that the correct dimension can be obtained only by adding the correction value. Conversely, where the dimension is smaller, the correct dimension can be obtained by the subtraction of the correction value.

Figure 24:
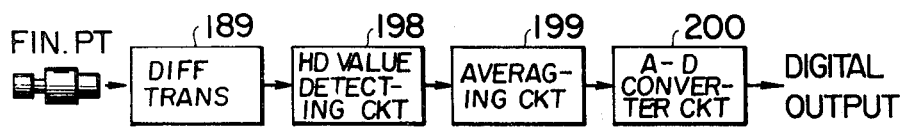
FIG. 24 is a block diagram of an automatic dimension measuring unit.
Figure 25:
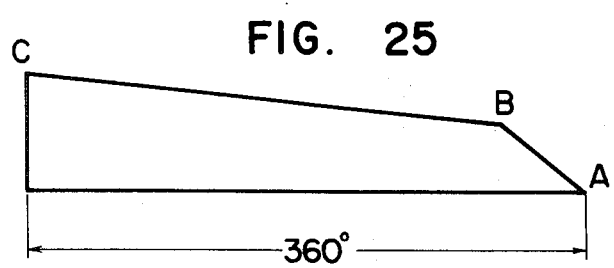
FIG. 25 is a diagram illustrating the principle of a linear cam.

The automatic dimension measuring means 177 is composed of a circuit as indicated by the block diagram of FIG. 24. Namely, a signal emitted from the differential transformer 189 is fed to a head value detecting circuit 198 which detects and memorizes the peak value of the curve shown in FIG. 23. The peak value thus detected is fed to an averaging circuit 199 which derives a mean value of the peak value and the previously measured values, and the mean value is digitized by an analog-digital converter circuit 200 and set in the correction register 178 shown in FIG. 14. The value thus set in the correction register is zero during calibration, is a plus value when the parts is larger and is a minus value when the parts is smaller. The value is set together with a plus or minus symbol.

Each of the control means shown in FIGS. 14 and 24 consists mainly of a digital circuit comprising electric parts, such as transistors, electrically connected with each other in a known manner, or of such digital circuit and an analog circuit combined with a portion thereof, so as to obtain the above-described functions respectively. Although in the embodiment described and illustrated herein, use is made of a paper tape incorporating all the information in the form of punch holes, it will be obviously understood that a card or other digital information source, such as a magnetic tape or magnetic drum, may also be used instead of the paper tape.

EFFECTS OF THE INVENTION:

1. As described above, according to the present invention an automatic lathe comprises an information source means provided with a working information therein, an electric control means for reading the working information of the information source means and thereby controlling the operations of driving source means, and cutting tool mounts and a material feeder operated according to the operations of the driving source means. By feeding the working information in the information source means, the operations of the driving source means can suitably be controlled and cutting tools mounted on the cutting tool mounts and a rotating rod material mounted in the material feeder are automatically moved the desired dimensions, whereby a parts of correct dimension can be obtained, no matter how complicate the configuration of the parts may be. In addition, parts of different types can be obtained very easily, only by changing the information source means.

2. According to the invention an automatic lathe comprises an information source means with a working information fed therein, an electric control means for reading the working information of the information source means and thereby controlling the operation of a driving source means, a shaft driven from the driving source means, a linear cam mounted on the shaft and having a cam surface which defines an Archimedes curve, and a cam follower engaging the cam surface at one end and operatively connected with a cutting tool mount at the other end thereof, said cam follower being moved and accordingly a cutting tool mounted on the cutting tool mount being moved in proportion to the angle of rotation of the shaft, and the driving source means being precisely controlled by the working information. Therefore, by rotating the shaft through a desired angle, the cutting tool is moved forward or backward by a desired dimension and hence the rod material can be worked precisely in the predetermined dimension. It is not necessary to use a cam of complicated configuration and to exchange it with a cam of different configuration at each time the type of a desired parts varies, as is in the past. A parts of different type can be obtained only by changing the information source means and the cam used can be produced by a simple work.

3. The cam surface of the linear cam used in the present invention is so shaped that the small diameter portion thereof defines an Archimedes curve of larger curvature and the large diameter portion defines an Archimedes curve of smaller curvature, and the cam follower is initially held in engagement with the small diameter portion which is larger in curvature. Therefore, when the linear cam begins to rotate, the cam follower is moved quickly and hence the cutting tool mounted on the cutting tool mount is also moved quickly toward the rod material. This is advantageous in shortening the time before the cutting tool gets close to the rod material and, therefore, in shortening the entire working time. When the cam follower reaches the large diameter portion of the cam surface, the movement of the cutting tool is slowed down to cut the rod material beautifully. Further, when the cam follower reaches the smallest diameter portion upon completion of the working, the cutting tool can be held remote from the rod material, as the curvature at the small diameter portion is large, and, therefore, it is possible to prevent inadvertent cutting of the rod material by the cutting tool or a damage to the cutting tool due to collision against another cutting tool being fed toward the rod material.

4. According to the invention, the cam follower in engagement with the cam surface of the linear cam is slidably and securably mounted in an arm, connected to the cutting tool mount, through a clutch mechanism which is operated according to the working information. When the clutch mechanism is in a disengaged position according to the working information, the cam follower only slides relative to the arm, even if the linear cam is rotated, and hence the arm and the cutting tool mount are not moved. Conversely, when the clutch mechanism is in an engaged position, the arm and the cutting tool mount are moved according to the curvature of the cam surface of the linear cam and thereby cutting of the rod material is attained. In other words, the cutting operation can be performed or stopped as desired by the position of the clutch mechanism, even with the linear cam being kept rotating. Particularly when a large number of linear cams are mounted on a single shaft and cutting tool mounts are provided each in association with each of the linear cams, it is possible, by rotating the shaft and selectively engaging or disengaging the clutch mechanism, to move a desired cutting tool mount only, while holding the remaining cutting tool mounts stationary.

5. According to the invention, the electric control means is provided with a switch to detect whether the clutch mechanism is in the engaged position or disengaged position. Therefore, when one clutch mechanism is in the engaged position, the switch detects such position of the clutch mechanism and holds the other clutch mechanisms in their disengaged positions, whereby collision of the cutting tools against each other, due to actuation of the other clutch mechanisms, and the resultant damage to the cutting tools can be avoided. Namely, when one cutting tool is in operation, the remaining cutting tools are held inoperative at locations remote from the working position.

6. According to the present invention an automatic lathe comprises a rockable cutting tool mount having a pair of cutting tools mounted thereon and being rockable about a shaft, a cam follower fixed to the rockable cutting tool mount, a cam follower connected to the rockable cutting tool mount through a clutch mechanism, and a pair of linear cams each having a cam surface which defines an Archimedes curve and mounted on a common shaft for engagement with each of the cam followers in such a manner that the curvatures of the cam surfaces thereof are in opposite directions to each other. When the clutch mechanism is brought into an engaged position, the cam follower provided with the clutch mechanism moves up and down in sliding engagement with the cam surface of the associated linear cam, whereby one end of the rockable cutting tool mount is moved upwardly and thereby one of the cutting tools is moved toward the rod material to perform a cutting operation. On the other hand, when the clutch mechanism is brought into a disengaged position, the cam follower which is fixed to the rockable cutting tool mount moves up and down in sliding contact with the cam surface of the other linear cam, whereby the one end of the rockable cutting tool mount is lowered, though the shaft having the linear cams mounted thereon keeps rotating in the same direction, and the other cutting tool is moved toward the rod material to perform a cutting operation. Where it is desired to cause a rocking motion of the rockable cutting tool mount by only one cam, it becomes necessary to use a half of the cam surface of the cam for operating one of the cutting tools and the other half for operating the other cutting tool, and hence the cam plate becomes extremely large in radius. According to the present invention, however, linear cams of the same size as those for the other cutting tool mounts can be used for operating the rockable cutting tool mount, so that the lathe can be assembled without subjecting to a space limitation and further the cams proper can be produced by a simple work.

7. According to the present invention an automatic lathe comprises a material feeder capable of gripping and rotating a rod material and being slidable in the axial direction, a cam follower operatively connected to the material feeder through an arm, a linear cam having a cam surface which defines an Archimedes curve and is in engagement with the cam follower, a driving source means for driving a shaft on which the linear cam is fixedly mounted, a plurality of cutting tool mounts provided in opposed relation to the rod material, a plurality of cam followers operatively connected to arms respectively through a clutch mechanism, the arms being connected to the cutting tool mounts respectively, a plurality of linear cams each provided for engagement with each of the cam followers and having a cam surface which defines an Archiemedes curve and is in sliding engagement with the cooperating cam follower, a single shaft having the plurality of linear cams fixedly mounted thereon, another driving source means for driving the shaft, and an electric control means for controlling the operations of the two driving source means and the clutch mechanisms according to a working information obtained from an information source means. The rotation of the two driving source means and the engagement or disengagement of the clutch mechanisms are controlled according to the working information, and only that one of the plurality of cutting tool mounts which is associated with the clutch mechanism in an engaged position is moved toward the rotating rod material to perform a cutting operation. In this case, the rod material is also carried toward the cutting tool by the material feeder. The movement of the material feeder, the movement of the cutting tool mount and the selection of the cutting tool mount by the clutch mechanism are suitably controlled by the working information and a parts of a desired configuration can be obtained, no matter how complicate the configuration may be. In the past, it has been necessary to use a cam plate of a special configuration for obtaining a specific type of parts and a large time and labor have been required for the production of such cam plate. According to the invention, a desired cutting operation can be attained only by feeding the working information in the information source means. This is highly advantageous in the production of different types of parts.

8. According to the invention, an automatic lathe comprises an information source means having a working information fed therein, an electric control device provided with a motor control means for controlling the rotation of a stepping motor upon reading the working information, a cam shaft driven from the stepping motor, linear cams each mounted on the cam shaft and having a cam surface which defines an Archimedes curve, driven members such as cutting tool mounts and a material feeder operatively connected to cam followers which are provided opposite to the linear cams respectively, a limit switch provided on each of the cam shafts and an origin detector mounted on the drive shaft of each of said stepping motors for detecting the origin of the stepping motor; the electric control device including a correction instructing code for receiving a correction instruction from the working information and a timing control means for receiving a signal from the correction instructing code and signals from said limit switch and the origin detector and sending a signal to the motor control means to stop the stepping motors at their origins. In the production of one parts, both stepping motors rotate in nomal and reverse directions repeatedly and even if a step error occurs for some reasons during rotation of the stepping motors, both stepping motors are always returned to their origins when the parts has been completed, and start to rotate again from the origins for the working of the next parts. Therefore, the step error which has occurred in the production of one parts will not be accumulated in the next parts. Namely, the accumulation of error which has been the drawback of the incremental open loop type can completely be eliminated.

9. According to the invention an automatic lathe comprises an information source means having a working information fed therein, an electric control device for controlling the rotation of stepping motors upon reading the working information, driven members such as cutting tool mounts and a material feeder operatively connected to the stepping motors so as to be moved in proportion to the angles of rotation of the stepping motors, and an origin detector for detecting the origin of each of the stepping motors; the electric control device including a check instructing code for receiving a check instruction from the working information, a numeral register for receiving a reference numeral from the working information and memorizing the same, a timing control means for actuating a pulse generator upon receiving a signal from the check instructing code, a motor control means for rotating the stepping motors upon receiving a pulse signal from the pulse generator, a subtraction circuit for receiving the pulse signal and subtracting it from the reference numeral memorized in the numeral register, and a zero decision circuit for deciding whether the reference numeral memorized in the numeral register is zero or not when a signal is emitted from the origin detector. When the number of steps which the stepping motor actually rotated and the reference numeral given from the working information are the same or when the zero decision circuit makes a zero decision, this means that the parts has been worked in a correct dimension, whereas when both numerals are not the same and the zero decision circuit detects a minus or plus value and makes a decision other than zero, this means that the parts has not been worked in the correct dimension. Therefore, by repeating such check on every cycle of cutting operation or several cycles of cutting operation, the occurrence of a defective parts can be known in time and thus the operation efficiency can be enhanced.

10. According to the present invention an automatic lathe comprises an information source means having a working information fed therein, an electric control device for controlling the rotation of stepping motors upon reading the working information and driven members such as cutting tool mounts and a material feeder moved in proportion to the angles of rotation of the stepping motors, the electric control device including a parts measuring means for measuring the dimensions of a plurality of parts and averaging and digitizing the difference between the actually measured dimensions and a desired dimension, a correction register for memorizing a correction numeral from the parts measuring means, a numeral register for memorizing a numeral which is obtained by adding to or subtracting from the numeral from the working information the correction numeral from the correction register, a timing control means for actuating a pulse generator upon receiving an operation start instruction from the working information, a motor control means for controlling the rotation of the stepping mootr upon receiving a pulse signal from the pulse generator, a subtraction circuit for receiving the pulse signal and subtracting it from the numeral memorized in the numeral register, and a zero decision circuit for detecting the fact that the numeral memorized in the numeral register has been subtracted to zero and giving a signal to the timing control means to stop the operation of the pulse generator. Even if the cutting tool has become substantially shorter or longer due to wear of the cutting edge or attachment of the material to the cutting edge, and it has become impossible to obtain a correct dimension of the parts, the dimensional error caused by such reasons can be corrected by the parts measuring means and the correction register. Therefore, the parts are always obtained in the correct dimension. Further, since the dimensional errors are averaged, in no cases will the parts be influenced by the errors caused by other reasons even if there are such errors.

11. According to the present invention an automatic lathe comprises an information source means having a working information fed therein, an electric control device for controlling the operations of driving source means upon reading the working information, cutting tool mounts and a material feeder moved by the drives from the driving source means, a pivotable parts delivery chute provided at a location where a parts produced by cutting a rod material gripped by the material feeder drops, pivotable discrimination chutes provided successively to the parts delivery chute for changing the direction of flow of the parts, and solenoids for operating the parts delivery chute and the discrimination chutes under control of said electric control device. By feeding the working information in the information source means according to the type of a desired parts, the electric control device is actuated and the solenoids are energized or deenergized under control of the electric control device, whereby the direction of flow of the parts defined by the parts delivery chute and the discrimination chutes is shifted and the parts can be sorted by the types thereof. When a defective parts occurs, the solenoid associated with the parts delivery chute is deenergized by the function of the electric control circuit to keep the parts delivery chute away from the parts dropping position, whereby the defective parts drops together with the chip outside the parts delivery chute. Namely, the parts delivery chute is brought to the parts dropping position only when the solenoid is energized and the solenoid is held deenergized during the cutting operation. Therefore, in no cases will the chip drop on the parts delivery chute.

12. Further, according to the invention an automatic lathe comprises an information source means having a working information fed therein, an electric control device for controlling the operations of driving source means upon reading the working information, a material feeder operated by the drive from the driving source means, a drilling tool mount provided in opposed relation to a rotating rod material gripped by the material feeder and moved axially of the rod material by the drive from the driving source means, the drilling tool mount being rotatably mounted on a shaft parallel to the axis of the rod material and having a plurality of drilling tools mounted therein at locations equally spaced radially from the center of the shaft, and a solenoid for rotating the drilling tool mount upon receiving a signal from the electric control device. The drilling tools can selectively be located opposite to the end face of the rod material by actuating the electric control device according to the working information and thereby energizing or deenergizing the solenoid. After a desired drilling tool has been placed in the working position, the drilling tool mount is moved toward the rod material according to the working information from the information source means, whereby a desired size of hole can be drilled in the end face of the rod material. The configuration of the hole can be varied by the type of the drilling tool selected by the solenoid.

13. Still further, according to the invention an automatic lathe comprises an information source means having a working information fed therein, an electric control device for controlling the operations of driving source means upon reading the working information, a material feeder slidably moved by the drive from the driving source means, cutting tool mounts provided in opposed relation to a rod material rotatably gripped by the material feeder and respectively moved toward and away from the rod material by the drive from the driving source means under control of the electric control device, a collet chuck provided in the material feeder to grip and rotate the rod material, and a solenoid to close or open the collet chuck under control of the electric control device. The collet chuck can be closed or opened by energizing or deenergizing the solenoid by the electric control device according to the working information and the sliding movement of the material feeder in the axial direction is controlled in association with the closing or opening of said collet chuck. Therefore, the length of the rod material to be worked can be made far greater than the maximum sliding distance of the material feeder and hence a considerably long parts can be obtained.

What is claimed is:

1. An automatic lathe, comprising:
cutting tool means for shaping a workpiece;
a stepping motor coupled to said cutting tool means for driving said cutting tool means from an origin point into and out of engagement with said workpiece;
pulse generating means coupled to said motor for rotatably driving said motor in response to pulse signals generated by said pulse generating means;
storage means for storing a value corresponding to a desired amount said motor is to be stepped in a forward direction by said pulse generating means;
means for detecting when said motor has been stepped in said forward direction an amount corresponding to the value stored in said storage means and generating a stop signal when said corresponding amount is detected;
control means for stopping the stepping of said motor at an end point when said detecting means generates said stop signal;
counting means for counting the number of pulses required to step said motor in a reverse direction back to said origin point from said end point; and comparing means for comparing the number of pulses counted by said counting means with said value corresponding to said desired amount of forward direction stepping of said motor.

2. The automatic lathe according to claim 1, further comprising subtracting means coupled between said pulse generating means and storage means for subtracting pulses generated by said pulse generating means from the value stored in said storage means; and wherein said detecting means comprises zero detecting means for detecting when the value stored in said storage means reaches zero, and said control means includes means for stopping the stepping of said motor when said detecting means detects said zero value.

3. An automatic lathe according to claim 2, further comprising: a parts delivery chute; means to selectively move said chute to an operating position to receive finished workpieces; a plurality of parts discrimination chutes, at least one of said parts discrimination chutes being located to receive said finished workpieces delivered from said parts delivery chute located at its operating position and to provide a path for transporting the received workpieces to one of a plurality of receptacles; means to selectively move said at least one parts discrimination chute to change the direction of said path to transport said workpieces to a different receptacle; and means to selectively move the remainder of said parts discrimination chutes to provide further paths for transporting said received workpieces to a corresponding plurality of receptacles.

4. An automatic lathe, comprising:
cutting tool means for shaping a workpiece;
means for driving said cutting tool means in a forward direction from an origin point into engagement with said workpiece;
storage means for storing a value corresponding to a desired amount said cutting means is to be driven in said forward direction;
means for detecting when said cutting means has been driven in said forward direction to a predetermined end point and generating a stop signal when said end point is detected;
control means for stopping the driving of said cutting means at said end point and returning said cutting means to said origin point;
measuring means for determining the amount of travel required to return said cutting means back to said origin point from said end point; and
comparing means for comparing the output of said measuring means with said value corresponding to said desired amount said cutting means is to be driven in said forward direction.

* * * * *